Aug. 11, 1936.  R. OHLSEN ET AL  2,050,455
SEALING MACHINE
Filed Sept. 16, 1932   8 Sheets-Sheet 5

Aug. 11, 1936.　　　R. OHLSEN ET AL　　　2,050,455
SEALING MACHINE
Filed Sept. 16, 1932　　　8 Sheets-Sheet 7

Aug. 11, 1936.  R. OHLSEN ET AL  2,050,455
SEALING MACHINE
Filed Sept. 16, 1932   8 Sheets-Sheet 8

Inventors:
Ray Ohlsen &
Anton J. Knutkowski
By John E. Gardner
Atty.

Patented Aug. 11, 1936

2,050,455

UNITED STATES PATENT OFFICE 2,050,455

SEALING MACHINE

Ray Ohlsen, Downers Grove, and Anton J. Knutkowski, Chicago, Ill., assignors to Dexter Folder Company, New York, N. Y., a corporation of New York (1934)

Application September 16, 1932, Serial No. 633,418

44 Claims. (Cl. 216—25)

The present invention relates in general to sealing machines.

One of the objects of the present invention is to provide a machine which will apply a gummed seal to the open edge of a folder.

Another object is to provide a machine of this character which will apply such seal irrespective of the number of times the folder is folded.

Another object is to provide a machine that will make the seal from a gummed roll of tape and apply it.

A further object is to provide mechanism for feeding a predetermined length of tape and cutting it off in such manner as to form a desirable seal.

A further object is to provide mechanism for conveying the sealed folders into a pile.

A further object is to provide a sealing device of this character that is readily accessible for adjustment.

A further object is to provide means for automatically applying a predetermined amount of water to the seal so that it will stick readily without any possibility of coming loose.

A further object is to provide means for properly timing the application of the seal to the folders.

A still further object is to provide a machine or device of this character that may be operated as a separate unit or as an attachment for or an integral part of well known folding machines.

Still another object is to provide a device of this character in which the feeding power of the folding mechanism may be employed thereby greatly simplifying the sealing machine.

Still another object is to provide an attachment for a folding machine which will not in any way interfere with the normal operation of the same.

A still further object is to provide a combined sealing and folding machine so that the sealing and folding may all be performed in one operation.

There are other objects of our invention which together with the foregoing will be described in the detailed specification that is to follow, taken in conjunction with the accompanying drawings, forming a part hereof:

In practicing our invention, we provide a frame which is adapted to cooperate with the frame of the usual type folding machine and which forms a support for the sealing mechanism.

Our sealing mechanism comprises, in accordance with one aspect of our invention, a plurality of feeding rollers, a reversing device for reversing the direction of travel of the folder, a tape feeding mechanism by which the tape is fed into the sealing mechanism proper, which consists of rollers for feeding the tape and watering it and mechanism for cutting the tape in proper lengths and applying it to the edges of the folder, and means by which the sealed folders are fed from the machine and stacked.

The sealing mechanism may thus employ the means for producing the folder and obtain its power therefrom.

The drawings which illustrate a certain embodiment of our invention show it applied to a well-known type of folding machine, known in the art as the "Cleveland".

It will, of course, be understood that our invention may be readily embodied or attached to other types of folding machines.

Referring now to the drawings.

Like reference characters in the various figures of the drawings in the following description will serve to designate like parts throughout.

Figure 1:
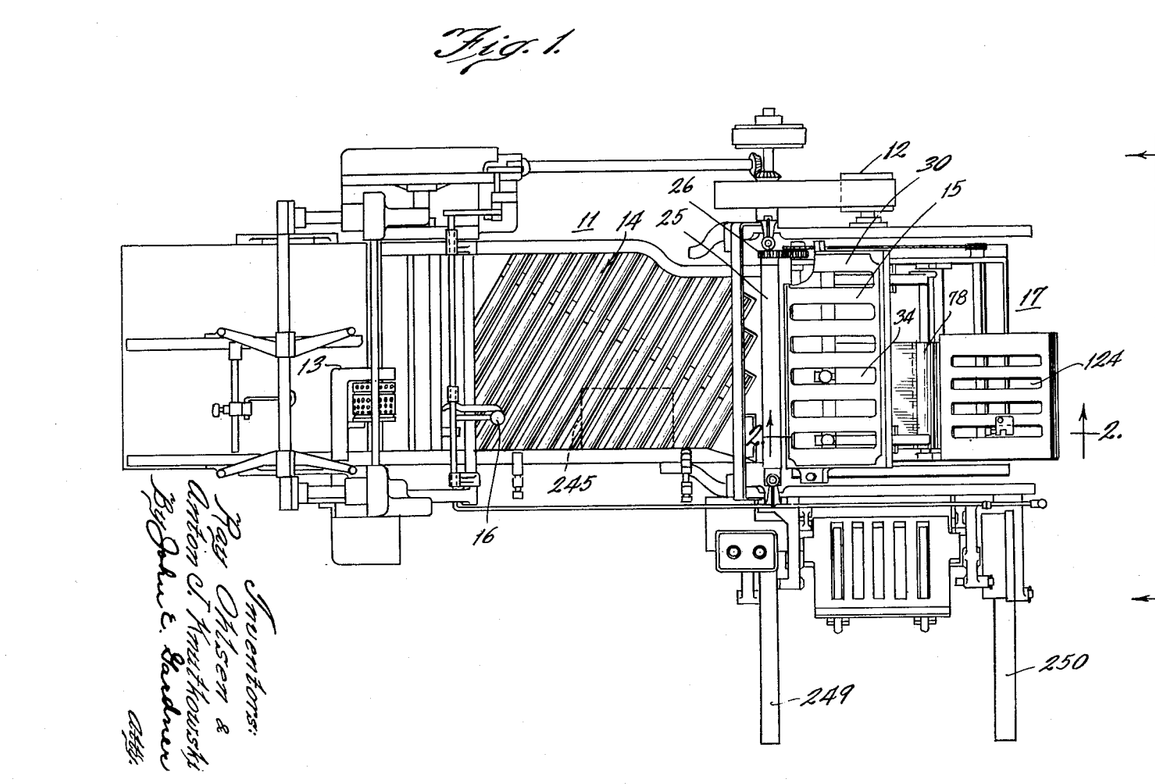
Fig. 1 is a top plan view of a so-called "Cleveland" folding machine with our improved sealing machine or mechanism attached thereto.

The reference character 11 designates generally a well known "Cleveland" folding machine which is provided with the usual driving motor 12 feeding mechanism 13 and diagonally placed feeding rollers 14 for feeding the sheets to be folded in the direction of the folding mechanism 15. The folding machine is also provided with an automatic trip 16 which is operative to stop the machine in the event the pneumatic feed 13 places or feeds two of the sheets to be folded in at a time. Our sealing mechanism indicated generally by the reference character 17 comprises a metal frame indicated generally by the reference character 18 of a general rectangular shape, the side members 19 of which are provided with outwardly extending flanges 20 adapted to rest upon angles 21 suitably secured to the main folder frame 23.

A cross angle member 24 is suitably secured to the side members 19 of the sealing machine frame 18 or formed integrally therewith.

The folding machine 11 is provided with a feeding roller 25 toward the end thereof having a spur gear 26 attached to one of its ends and adapted to mesh with a spur gear 27 secured to another feed roller 28 rotatable in bearings provided in the main folder frame 23. A bracket 29 suitably secured to the main folder frame 23 supports a folding element 30 comprising a pair of plates 31 and 32 suitably spaced by a spacing member 33 and provided with slots 34 therein to reduce the friction of the paper.

The spacing member 33 is provided with adjustable V-shaped stops 35 to stop the upward travel of the paper. The lower edges of the two plates 31 and 32 are flared outwardly, as at 36 and 37 to guide the paper in the direction of the stop 35. The gear 27 on the roller 28 also meshes with a spur gear 38 suitably secured to a feeding roller 39, which is rotatable on bearings in the main folder frame 23. The spur gear 38 meshes with a spur gear 40 secured to a feeding roller 41 mounted upon a shaft 42 rotatable in bearings in the main folder frame 23.

The spur gear 40 is adapted to mesh with a gear 43 suitably splined on a shaft 44 rotatable in bearings in the main frame 23.

The shaft 44 rotates in a pivoted bracket 45 secured to the main frame so that the gear 43 may be adjusted to a certain extent.

The spur gear 43 is adapted to mesh with a spur gear 46 secured to a shaft 47 rotatable in bearings in the sealing device frame 18. The shaft 47 carries a feeding roller 48 suitably affixed thereto. This feeding roller may be a tube of metal or other desired material secured to the shaft 47 in any desired manner.

Figure 6:
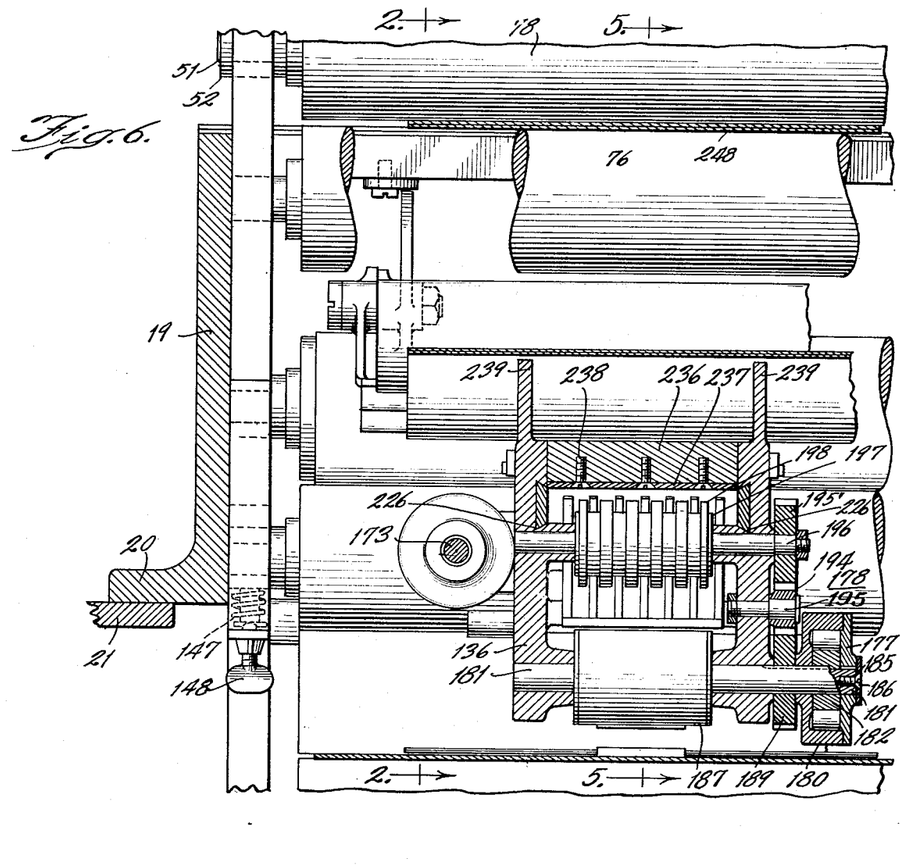
Fig. 6 is an end sectional elevation of our sealing device taken along the line 6—6 of Fig. 5 looking in the direction of the arrows.

A second feeding roller 49 is mounted upon a shaft 50 in any suitable manner directly above the feeding roller 48. The shaft 50 rotates in bearings 51 (Fig. 6) carried in brackets 52 secured to the frame 18 of the sealing device.

The bearings 51 are adjustably or resiliently mounted in the brackets 52 so that by movement of wing nuts such as 53, the spacing between the two feed rollers 48 and 49 may be controlled.

The shaft 47 is provided at its far end with a sprocket 54 around which passes a chain 55 which also passes around a sprocket 56 suitably secured to a shaft 57 rotatable in bearings 58 and 59 in the sealing frame 18. The shaft 47 is also provided with a V-grooved sheave or pulley 61 suitably secured thereto over which a V-belt 62 is adapted to run, which extends to another V-grooved pulley or sheave 63 suitably secured to a shaft 64 rotatable in bearings in the sealing device frame 18.

The shaft 64 is provided with a second V-grooved pulley or sheave 69 over which a V-shaped belt 70 runs and which is also led over another V-grooved sheave 71 suitably affixed to a shaft 72 rotatable in bearings 73 and 74 secured to the sealing device frame 18.

The shafts 64 and 72 are each provided with feeding rollers 75 and 76 respectively. Upper feeding rollers 77 and 78 secured to shafts 79 and 80 are mounted directly above the feeding rollers 75 and 76 and are rotatable in bearings, adjustably and resiliently mounted in brackets secured to the sealing frame 18 in the same manner as the roller 49 previously described. Wing nuts 81 and 82 serve to bring about the adjustment of the upper rollers 77 and 78 in the same manner as before. The frame 18 of the feeding device is provided with cross members 83 and 84. The cross member 84 is provided with a bracket 85 having an extension 86 carrying a guide shoe 87 in its front end (See Fig. 5).

A pivoted bracket 88 mounted upon a shaft 89 secured in bearings in the extension 86 is provided with a tape stopping member 90 in its lower end suitably affixed thereto by means of screws 91. The stopping member 90 is provided with a lip 92 having a downwardly extending flange 93 (See Fig. 5). The pivoted bracket 88 is provided with an extension 94 abutting a stop 95 integrally formed in the extension 86. The wooden cross members 83 and 84 support guide plates 96 and 97 having downwardly depressed edges 98 adjacent the feeding rollers 48 and 49, 75 and 77 and 76 and 78 for the purpose of guiding the folder through the rollers.

Figure 2:
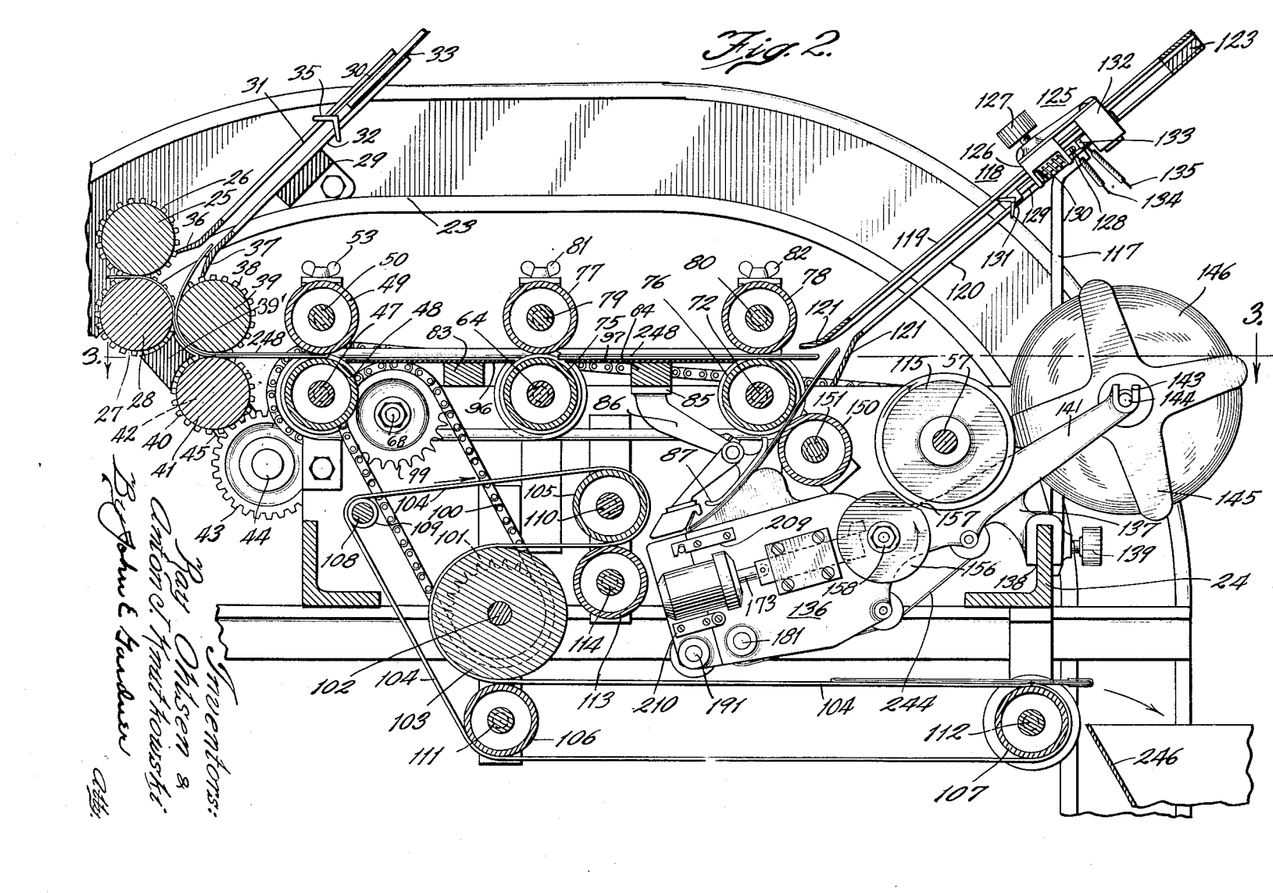
Fig. 2 is an enlarged sectional elevation of our sealing device or mechanism proper taken along the line 2—2 of Fig. 1 looking in the direction of the arrows.
Figure 3:
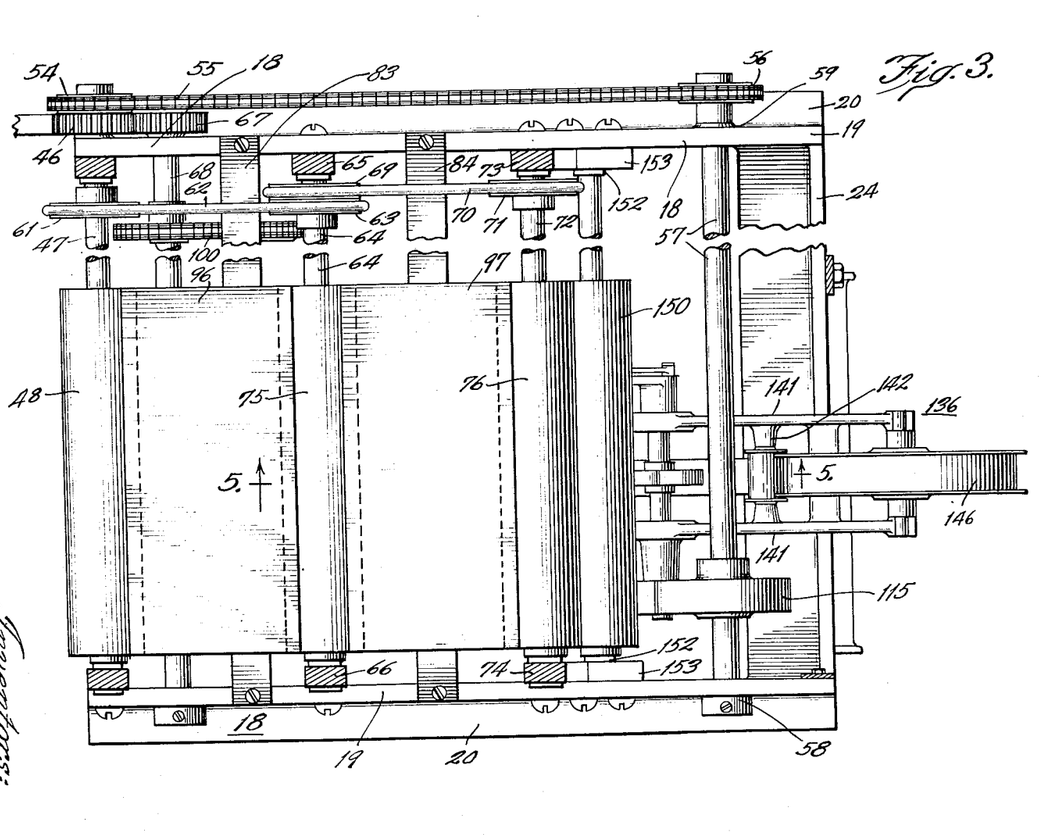
Fig. 3 is a cross section of the same taken along the line 3—3 of Fig. 2 looking in the direction of the arrows.
Figure 4:
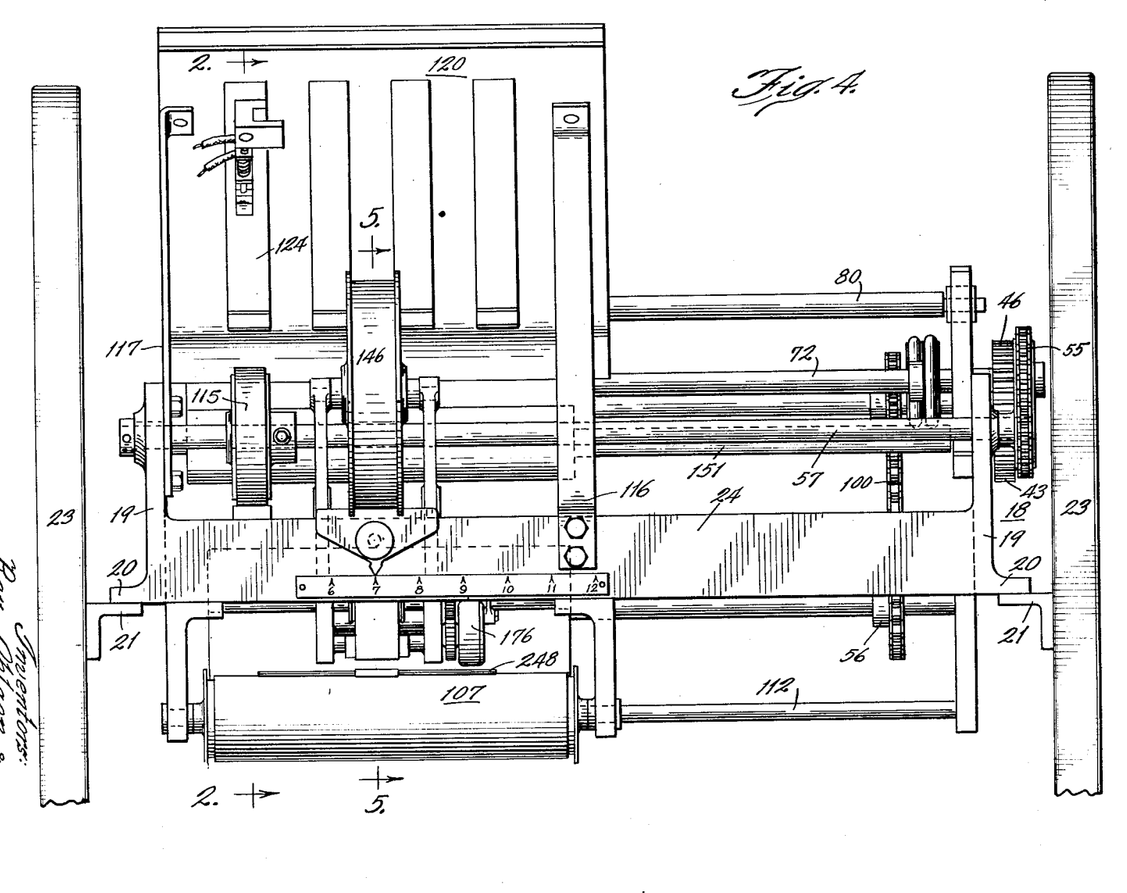
Fig. 4 is an enlarged end elevation of our improved sealing device attached to a folding machine, taken along the line 4—4 of Fig. 1 looking in the direction of the arrows.

The shaft 68 also carries a sprocket 99 (Fig. 2) suitably splined thereto over which runs a chain 100 engaging a sprocket 101 keyed to a shaft 102 rotating in bearings secured in the main sealing device frame 18. The shaft 102 has a belt driving roller 103 suitably secured thereto. A belt 104 extends around pulleys 105, 106 and 107 and also around a spacing rod 108. The spacing rod 108 is provided with a rotatable sleeve 109 and is secured to the main sealing frame 18.

The pulley 105 is mounted upon a shaft 110 rotatable in bearings in the main sealing frame 18. Pulleys 106 and 107 are similarly mounted upon shafts 111 and 112, respectively. A feeding roller 113 suitably affixed to a shaft 114 is mounted directly below the pulley 105. The shaft 114 is rotatable in bearings slideably mounted in brackets secured to the main sealing frame 18 and provided with springs 147 and adjusting screws 148 (Fig. 6) for adjusting the spacing between the belt 104 and the feeding roller 113.

The feeding roller 113 is mounted in friction contact with the belt 104 so as to be driven thereby. A rubber faced contact roller 115 is suitably secured to the shaft 57. Brackets 116 and 117 are suitably secured to the cross member 24 of the main sealing frame and extend outwardly therefrom to support a reversing panel 118.

Reversing panel 118 consists of a pair of metal plates 119 and 120 (Fig. 2) having outwardly flaring edges 121 and 122 adjacent the said rollers 76 and 78 suitably spaced apart and held in position by a spacing member 123, the whole being supported by the brackets 116 and 117, which are suitably secured by bolts and screws to the lower plate 120. The plates 119 and 120 have openings 124 therein for the purpose of reducing the friction with the folder.

An electrical contact making device 125 is mounted in one of the openings 124 adjacent the feeding side of the machine. The contact making device 125 comprises a bracket 126 adjustably clamped by a thumb screw 127 to the plate 119 and carrying a resiliently mounted contact member 128 therein. The contact making member 128 is supported upon a shaft 129 slideably mounted against the tension of the compression spring 130 on the bracket 126. The shaft 129 is provided at its lower end with a V-shaped member 131 filling the space between the plates 119 and 120. The bracket 126 is provided with an extension 132 which carries a contact member 133 adjacent the contact making member 128. Electrical connection may be made to the contact member 128 and the contact member 133 by wires 134 and 135.

It will be understood, of course, that any suitable electrical contacting device may be substituted for the one described.

A feeding roller 150 is mounted upon a shaft 151 in the main sealing device frame 18 adjacent the feeding roller 76, and driven thereby. The shaft 151 is rotatable in bearings 152 resiliently and adjustably mounted in brackets 153 secured to the main sealing frame 18. The feeding roller 150 is thus similarly mounted to the feeding rollers 49, 77 and 78.

The cross angle 24 of the main sealing frame carries an auxiliary frame 136 suitably clamped thereto by means of a supporting bracket 137 having a recess 138 adapted to fit the upstanding edge of the cross member 24 and screw threaded to receive a thumb screw 139. The auxiliary frame 136 comprises a metal casting having side members 141 and certain cross members 142. The two side members 141 are provided with U-shaped depressions at their ends 143 to provide a bearing for a shaft 144 supporting a spool 145 carrying a roll of gummed sealing tape 146.

Figure 7:
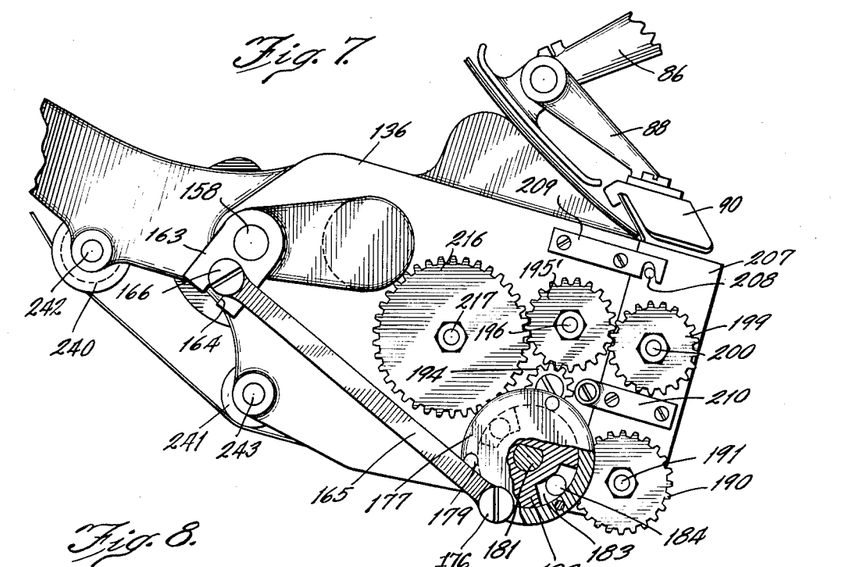
Fig. 7 is a side elevation of our improved sealing device taken along the line 7—7 of Fig. 10 looking in the direction of the arrows.

A contact roller 156 having a flared surface 157 is suitably mounted upon a shaft 158. The shaft 158 is rotatable in bearings 159 in the auxiliary frame 136. The shaft 158 is provided with a cam member 160 suitably affixed thereto (see Fig. 5) which is employed for actuating the knife to cut the gummed sealing tape. The shaft 158 is provided at its outer end with a hub member 161 suitably secured thereto and having formed as an integral part thereof a counter weight 162 and a bell crank extension 163 (see Fig. 7).

The bell crank extension 163 is provided with a slot 164 therein to carry a crank arm 165 which is adjustably clamped therein by means of a screw 166. The contact wheel 156 has inwardly projecting stops 167 formed as an integral part thereof. A sliding latching member 168 is slidably mounted in a bracket 169 suitably attached to the auxiliary frame 136 adapted to engage the stop 167. The latching member 168 is provided with an extension 170 abutting a compression spring 171 also mounted in the bracket 169. The latching member 168 is provided at its opposite end with a yoke 172 which is used to secure the latching member to the core 173 of the solenoid 174 suitably mounted on the auxiliary frame 136. A member 175 is provided for adjusting the movement of the core 173 and the movement of the latching member 168.

As before stated, the rotatable movement of the crank arm 163 brings about a reciprocating movement of the connecting rod 165. The connecting rod 165 is pivotally secured by means of a bolt 176 to a disc 177 and forming a bearing for the connecting rod 165. The disc 177 forms part of a one-way clutch mechanism 178. The disc 177 forms part of the clutch housing and is secured by means of screws 179 to a housing member 180 which is rotatable freely on a shaft 181. The shaft 181 carries a cam member 182 suitably splined thereto having pockets 183 into which roller clutch members 184 are placed.

By reason of the construction of the pockets 183, the clutch housing can rotate in a counter clock-wise direction (Fig. 7) without turning the shaft, while its movement in a clockwise direction will bring about a turning movement of the shaft 181.

A washer 185 is secured to the end of the shaft 181 by means of a bolt 186 to hold the clutch assembly 178 in place. The shaft 181 rotates in bearings in the auxiliary housing 136. The shaft 181 is provided with a feeding roller 187 suitably secured thereto. The feeding roller 187 may be provided with a face 188 of rubber or other suitable material. A spur gear 189 is suitably secured to the shaft 181 and meshes with a spur gear 190 affixed to a shaft 191 rotating in bearings provided in the auxiliary frame 136.

The shaft 191 is also provided with a feeding roller 192 which may be provided with a face of rubber or other suitable material 193 and is in close abutting relation with the feeding roller 187 or in contact therewith.

The spur gear 189 is in mesh with a pinion gear 194 rotatably mounted upon a stud shaft 195 secured to the auxiliary frame 136. The pinion 194 meshes with a spur gear 195 secured to a shaft 196 rotatable in bearings in the auxiliary frame 136. The shaft 196 is provided with a watering and feeding roller 197 suitably affixed thereto. This watering and feeding roller may be made of metal and provided with raised rings 198 of rubber or other suitable material held frictionally in position thereon.

Figure 10:
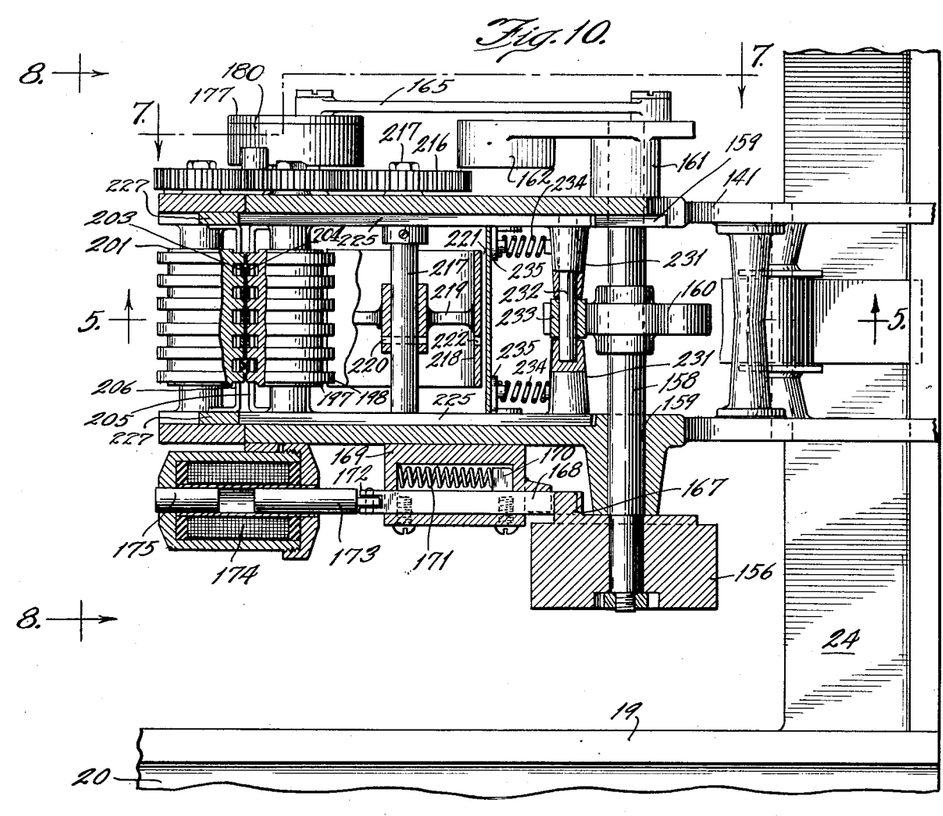
Fig. 10 is a section of our improved sealing mechanism taken along the line 10—10 of Fig. 5 looking in the direction of the arrows.

The spur gear 195' meshes with the spur gear 199 secured to a shaft 200 rotatable in bearings in the auxiliary frame 136. The shaft 200 carries a feeding roller 201 constructed of metal or other suitable material and provided with spaced apart ring members 202 of rubber or of other suitable material in frictional contact with the rubber rings 198 as may be seen in Fig. 10. The cooperating rubber rings on the rollers 197 and 201 respectively form spaces therebetween into which opposed flat guide wires 203 and 204 respectively, are placed.

The guide wires 204 associated with the roller 197 are mounted upon a frame 205 suitably secured to the auxiliary frame 136. In a like manner, a frame 206 supports the guide wires 203 associated with the roller 201. The shafts 191 and 200 are carried upon a detachable section 207 of the auxiliary frame 136. The detachable section 207 is secured to the auxiliary frame by pins 208 on either side of the detachable frame which cooperate with straps 209 secured to the auxiliary frame. A second pair of straps 210 is bolted to the detachable section 207 and each carries an extension projecting over the auxiliary frame 136 having a tubular boss 211 formed integrally therewith.

The tubular boss 211 is screw threaded at its outer end and contains an adjustment screw 212. The adjustment screw 212 provides a seat for a compression spring 213 which bears against a metal ball 214 cooperating with a V-shaped depression 215 in the auxiliary frame 136.

Figures 8, 9:
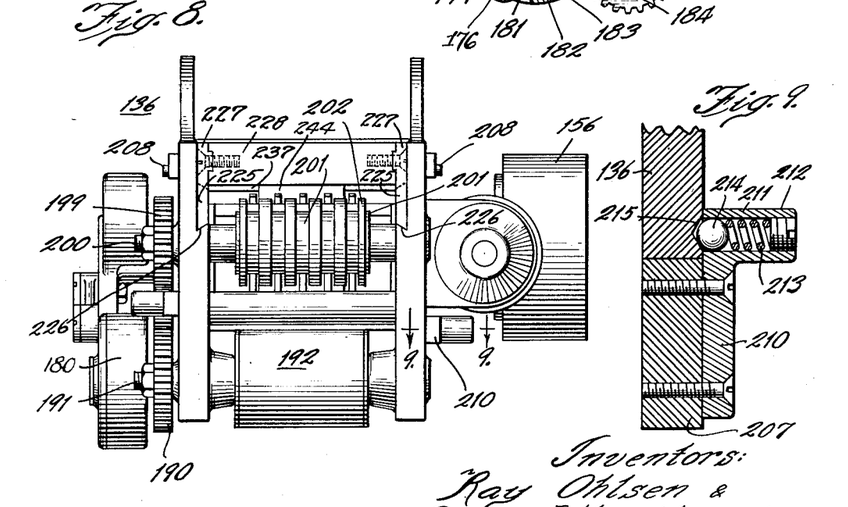
Fig. 8 is an end elevation of the same taken along the line 8—8 of Fig. 10 looking in the direction of the arrows.
Fig. 9 is a detailed section taken along the line 9—9 of Fig. 8 looking in the direction of the arrows.

The detachable frame 207, as before stated, carries a similar member 210 on each side. (See Figs. 7, 8 and 9.) It will be seen that this construction permits the detachable section 207 of the auxiliary frame to be readily removed. A slight pull on the gear member 190 will release the balls 214 from the depressions 215 and permit swinging movement of the detachable section. The section may then be pulled from the position in the strap members 209 and access obtained to the interior of the feeding rollers on the shafts 196 and 181. It will be remembered that the frame 206 containing the guide wires 203 is secured to the detachable section so that the guide wire frames are also divided.

The spur gear 195' also meshes with the spur gear 216 secured to a shaft 217 rotatable in bearings in the auxiliary frame 136. The shaft 217 is provided with a watering wheel 218 suitably secured thereto. The watering wheel is provided with a wide surface supported upon a narrow web 219. A pin 220 penetrating an opening in the shaft 217 serves to hold it in position. The watering wheel 218 may be constructed of metal or other suitable material and is provided with a surface 221 of felt or other similar material. An opening 222 is provided in the surface of the watering wheel 218 to permit access to the pin 220.

A water container 223 is mounted immediately below the watering wheel on the auxiliary frame 136 by means of a bracket 224 supported on the cross member 142. Suitable connections may be made for filling and draining the water pan.

A knife bar frame 225 is slideably supported in V-shaped grooves 226 formed in the auxiliary frame 136. The knife bar frame 225 is provided with an upturned extension 227 (Fig. 8) to which is fastened a block 228. A knife blade 229 is suitably secured to the block 228 by means of screws 230. The knife frame 225 is provided with inward extensions or bosses 231 (see Fig. 10). The bosses 231 provide bearings for a shaft 232 carrying a roller 233 which bears against the cam member 160.

A pair of compression springs 234 seat against the bosses 231 and also on brackets 235 secured to the auxiliary frame 136. The compression springs 234 thus urge the knife frame and the roller 233 against the cam member 160. A stationary knife block 236 is suitably secured to the auxiliary frame 136 and carries a stationary knife 237 suitably held in place by means of screws 238 and adapted to cooperate with the movable knife 229. The auxiliary frame 136 is provided with extensions 239 which serve as guiding members for the folders in cooperation with the guide shoe 87. Idling and guiding rollers 240 and 241 are mounted upon shafts 242 and 243 rotatably mounted in bearings in the auxiliary frame 136 and serve as guides for a strip of gummed tape 244 which is fed from the roll 146.

The gummed tape is led over the rollers 240 and 241 between the feeding rollers 187 and 192 between the guide wires 203 and 204 and feeding rollers 197 and 201 to the cooperating knife blades 229 and 237.

The tape stopping member 90 has a lip 92 which cooperates with the inclined surface of the block 228 carrying the moving knife blade to form the tape into a V-shape as a segment thereof is cut.

Having described the detailed mechanical construction of an embodiment of our invention, we shall now explain its detailed operation. For this purpose, the operation from the time the sheet is fed into the folding machine until the time it is delivered will be described.

The sheets, such as 245, are fed by the feeding mechanism 13 onto the rollers 14 where they are carried forward with their edges abutting the side of the folding machine by reason of the transverse position of the rollers 14 into the rollers 25 and 28. The edge of the sheet to be folded is then fed into the folding panel 30 where it encounters the stop 35 causing the sheet to bend and to be fed between the rollers 28 and 39. This causes the sheet to be folded once and guided by a deflector 39' between rollers 39 and 41. It will be understood, of course, that depending upon the construction and manner in which the folding machine 11 is adjusted, any number of additional folds may be made, in substantially the same manner as there illustrated.

After the sheet 245 has been folded into a folder 248, it is fed by the rollers 39 and 41 between the rollers 48 and 49 of the main sealing device frame 23, the folded edge coming first, the feeding rollers 48 and 49, 75 and 77 and 76 and 78 serving to feed the folder 248 forward, and the folder 248 being supported between the rollers by the plates 96 and 97. The folder is fed by the rollers 76 and 78 into the reversing panel 118 where the folded edge of the folder encounters the stop 131 and brings about the engagement of the contact making member 128 with the contact member 133. The folder then falls both by the action of the compression spring 130 and by gravity guided by the flaring edge 121 between the feeding rollers 76 and 150, the roller 76 also assisting the movement. The feeding rollers 76 and 150 serve to feed the folder with its open edge forward between the guide shoe 87 and the extensions 239 of the auxiliary frame 136 toward the V-shaped sealing tape which is held in position by the sealing shoe 90 and the block 228.

The manner in which the tape is caused to assume this position will now be described. This operation occurs responsive to the closure of the contact members 128 and 133 whereby a circuit is completed for the solenoid 174. The solenoid 174 is energized to attract its core 173 against the compression of the spring 171 and withdraws the latching member 168 from engagement with the latch 167. The counter weight 162 then turns the shaft 158 so that the driven roller or wheel 156 is turned to bring its circular surface into contact with the driving wheel 115. As soon as the folder starts its downward motion into the feeding rollers 76 and 150, the contact members are opened and the solenoid 174 is de-energized and the spring 171 operates to again place the latching member 168 in such position to engage the stop 167 on the wheel 156 after it has completed one revolution.

The driving wheel 115 is operating constantly as a result of the operation of the motor 12 through the various driving connections and gears previously described in the mechanical construction of our invention. The rotation of the shaft 158 will continue through one revolution or until the flattened surface 157 is again adjacent the driving wheel 115. The turning movement of the shaft 158 also turns the cam 160 so that the movable knife frame or carriage 225 is forced to the left sliding in the V-grooves 226 in the auxiliary frame 136 and compressing the springs 234. This movement of the knife carrying frame 225 brings the lower knife 229 in such position that the gummed tape 244 can be fed upwardly between the knives 229, 237 to the lip 92 by the rollers 187, 192, 197 and 201. The movement of the shaft 158 reciprocates the connecting rod 165. The preliminary movement of the connecting rod is such that a contra-clockwise rotation of the clutch casing comprising the members 177 and 180 occurs and no motion is transmitted to the shaft 181. When the cam 160 has moved the carriage 225 over in such position that the movement of the tape in an upward direction can occur, the connecting rod 165 is moved in the opposite direction and the clutch casing brings about the clockwise rotation of the shaft 181 through the clutch rollers 184. The movement of the shaft 181 by reason of the gear connections previously described brings about rotation of the shafts 191, 196, 200 and 211. In other words, the rollers 187, 192, 197 and 201 are rotated to feed the gummed tape 244 upwardly into the groove formed by the lip 92. As the tape moves upwardly, the watering wheel 218 is rotated and since its surface is formed of felt, a certain amount of water moistens the roller 197.

The roller 197 is not in direct contact with the watering wheel 218 but the contact is made by means of the spaced apart rubber rings 198. Consequently, the gummed surface of the tape which faces the roller 197 is moistened in parallel strips where the rings 198 engage the surface thereof. The guide wires 203 and 204 serve to guide the tape as it moves upwardly into the lip 92.

The movement of the tape causes it to lie on the inclined plane formed by the shoe 90. The continued rotation of the shaft 158, then brings about the movement of the connecting rod 165 in the opposite direction so that the upward movement of the tape ceases.

The further rotation of the shaft 158 finally brings the cam 160 in such position that the movable knife carriage 225 can move to its original position under the influence of the compression springs 234. This movement of the knife carriage 225 carries the movable knife blade 129 across the fixed knife blade 237 with the tape interposed thereby, shearing or cutting the tape.

Figure 5:
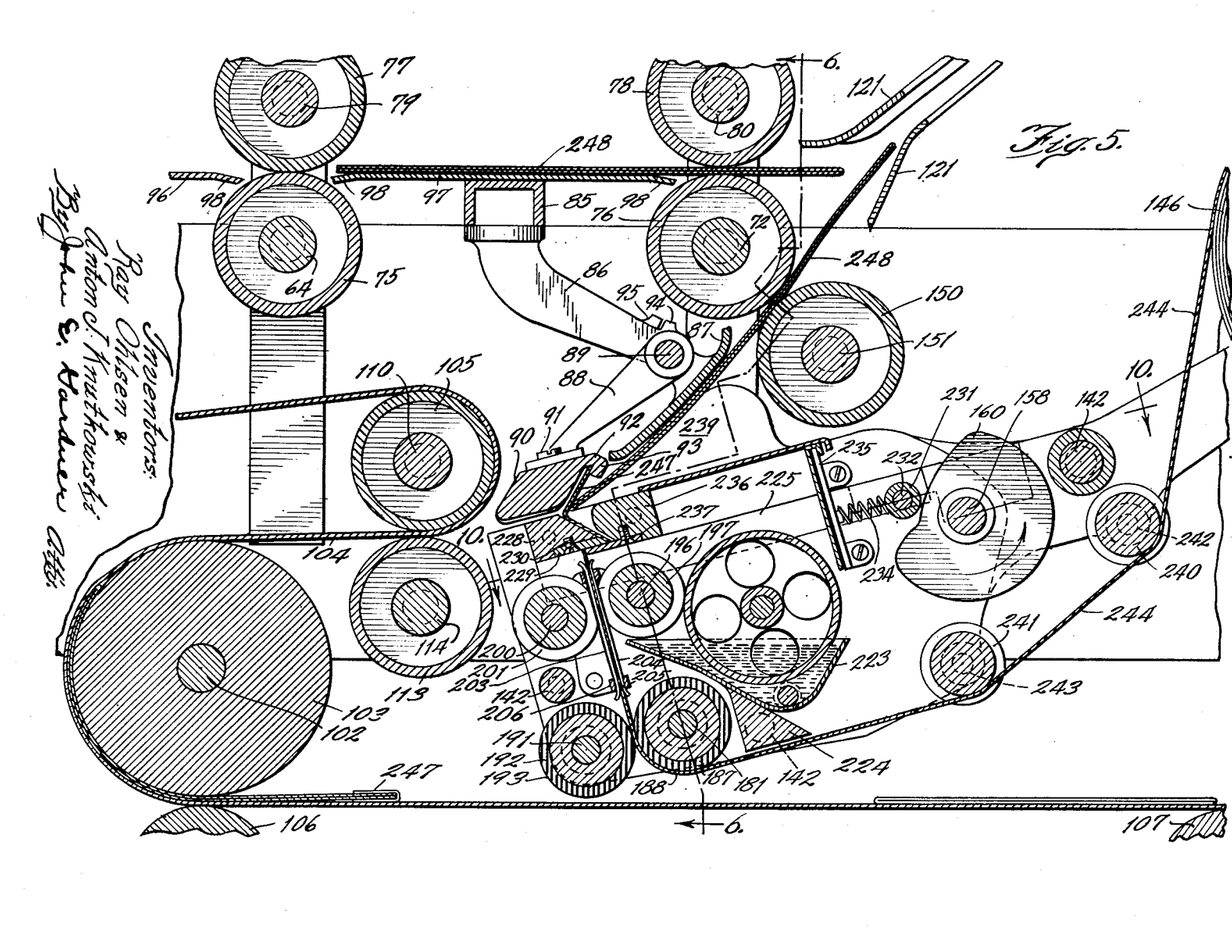
Fig. 5 is another enlarged sectional elevation of our machine taken along the line 5—5 of Fig. 3 looking in the direction of the arrows.

The movement of the inclined surface of the block 228 toward the block 236 forms the tape that has been cut off into a V-shape (see Fig. 5). Shortly thereafter, the edges of the folder 248 come to the bottom of the V and the forward movement of the folder 245 as a result of the feeding action of the feeding rollers 76 and 150 cause the folder to pass between the opposed seal applying surfaces of shoe 90 and block 228 which furnishes the folder with the seal 247 that has been cut off between the sealing shoe 90 and the block. By the pressure between these two surfaces, the seal is securely applied on the folder 248 over the open leading edge thereof and serves to hold said edge closed in an obvious manner. The reason for applying the water to the gummed tape in strips is so that if there is any excess water applied to the tape along these strips, it will serve to moisten the intervening surface.

At the same time, as the strip is guided by the wires 204 and 203, it is not moistened where these wires are in contact with the gummed surface and there is less tendency for any adhesion of the tape to the wires. The bearing surface formed between the block 228 and the sealing shoe 90 may be controlled by gravity or by a spring about the shaft 89 and bearing against the brackets 86 and 88 in an obvious manner.

The shape of the surface of the shoe 90 and the block 228 is so arranged that the edges of the sheets constituting the folder are first secured at the deepest portion of the V-shaped seal and then the sides thereof are applied. The folder 248 is then fed between the conveying roller 113 and the belt 104 being guided by the belt 104 about the feeding roller 103 and conveyed by the belt 104 into a delivery chute or container 246 (see Fig. 2).

It will be seen that the roller 103 has a rather large diameter so that the turning radius of the folder 248 is quite long so that there will be no distortion of its edges adjacent the seal 247 which has been applied.

It will be seen that as each folder 248 is fed into the reversing panel 118, one revolution is given the shaft 158 and the gummed tape 244 is fed forward, watered and cut off, forming a seal 247, which is placed in position to receive the open ends of the folder 248 and after the folder has been sealed, it is fed forward and delivered. Our improved device will, therefore, seal the folders as rapidly as they are folded and fed into the mechanism. The gummed tape unwinds from the roll 146 which may be replaced when it is used, in an obvious manner.

Attention is directed to the fact that because of the removable section 207 upon which the rollers 193 and 201 are mounted as well as the guide frame 205, if there is any tendency for the tape to become clogged, access may be readily obtained to it with a minimum of effort. In other words, after the machine is run for some time and is stopped, a certain amount of water may be collected on the guide wires and dried, causing the tape to adhere thereto. This may be remedied by removing the section 207 and cleaning the guide wires and rollers.

Attention is also directed to the fact that the sealing mechanism itself is mounted upon the auxiliary frame 136 clamped in position by the clamping screw 139 so that it may be readily removed and another one substituted. Furthermore, the whole sealing mechanism including the feeding rollers, is mounted upon a frame 23 which can be very readily attached to the folding mechanism, at any convenient point, whether in the position shown or on the angles 249 and 250 to the side of the folding machine, depending upon the number of folds that you desire to make.

The auxiliary frame 136 can be moved upon the upstanding angle 24 in any position to bring about the desired placing of the seal, depending upon the size of the folder.

While we have shown an embodiment of our improved sealing machine as an attachment to a well known folder, it will be obvious, of course, that it may be constructed as a separate machine and the folders fed separately thereto instead of directly from the folding machine. However, when it is employed as an attachment to the folding machine, the sealing is accomplished in one operation and considerable apparatus, including the power drive and feeding mechanism, is common to both machines, thereby greatly reducing the cost of each.

While we have described a certain specific embodiment of our invention, we are aware that many modifications, changes and departures may be made therefrom, without departing from the spirit and scope of our invention, as set forth in the appended claims.

We claim:

1. In a machine of the character described, a set of three driven rollers, means at one side thereof for receiving a folded product from two of the rollers with a closed folded edge of the product leading, mechanism for applying a seal on said product over an opposite open edge thereof, and devices including one of said two rollers and the third roller for delivering the product from said means to said mechanism with said open edge leading.

2. In a machine of the character described, a set of three parallel rollers, means at one side thereof for receiving a folded product from two of the rollers with a closed folded edge of the product leading, mechanism for applying a seal on said product over an opposite open edge thereof, means for driving the rollers and operating the seal applying mechanism, and devices including one of said two rollers and the third roller for delivering the product from said first named means to said mechanism with said open edge leading.

3. In a machine of the character described, a set of three driven rollers from two of which a folded product is delivered with a closed folded edge thereof leading, mechanism at one side of the set of rollers for applying a seal on said product over an opposite open edge thereof, devices for receiving the product from the two driven rollers and disposed on the opposite side of said set, and means for delivering the product to the seal applying mechanism from said devices with said open edge leading, said last named means including one of said two rollers, the third roller, and mechanism for advancing the product therebetween.

4. In a machine of the character described, a set of three driven rollers, mechanism at one side thereof for applying a seal on a folded product over an open edge thereof, means at the opposite side of said set for receiving the folded product with an opposite closed folded edge thereof leading, and devices including an ejector, one of said two rollers, and the third roller for substantially reversing the direction of travel of the folded product and feeding it from said means to said mechanism with said open edge of said product leading.

5. In a machine of the character described, a set of three driven rollers, mechanism at one side thereof for producing a seal and applying it on a folded product over an open edge thereof, feeding and supporting means at opposite side of said set and to which the folded product is delivered from two of the rollers with an opposite closed folded edge thereof leading, and devices including one of said two rollers and the third roller receiving the folded product from said means, said devices being adapted to substantially reverse the direction of travel of the folded product and feed it to said mechanism with said open edge leading.

6. In a machine of the character described, a pair of rollers from which a folded product is delivered with a closed folded edge thereof leading, feeding means including one of said two rollers and a third roller and to which the folded product is delivered with an opposite open edge thereof leading, means for receiving the product from said pair of rollers and delivering it to said feeding means with said open edge leading, and means for thereafter applying a seal on the product over the open leading open edge thereof.

7. In a machine of the character described, a pair of rollers from which a folded product is delivered with a closed folded edge thereof leading, feeding means including one of said pair of rollers and a third roller and to which the folded product is delivered with an opposite open edge thereof leading, stationary inclined means for receiving the product from said pair of rollers and delivering said product to said feeding means with said open edge leading, and means for thereafter applying a seal on the product over the leading open edge thereof.

8. In a machine of the character described, means for receiving a folded product with a closed folded edge thereof leading, mechanism for applying a seal on said product over an opposite open edge thereof, devices for delivering the product from said means to the seal applying mechanism with said open edge leading, and operating means for said mechanism controlled by the product during travel of the same through said machine.

9. In a machine of the character described, means for receiving a folded product with a closed folded edge thereof leading, mechanism for producing a seal and applying it on said product over an opposite open edge thereof, devices for delivering the product from said means to the seal producing and applying mechanism with said open edge leading, means for operating the seal producing and applying mechanism, and mechanism controlled by the folded product and controlling the operation of said last named means.

10. In a machine of the character described, means for receiving and feeding a folded product in one direction with a closed folded edge thereof leading, a device along which the folded product is fed in said direction by said means, said device being positioned to provide for delivery of the folded product therefrom in the opposite direction clear of the receiving and feeding means and with an opposite open edge of the product leading, and mechanism for receiving the product from said device and applying a seal on said product over the open leading edge thereof.

11. In a machine of the character described, means for receiving and feeding a folded product in one direction with a closed folded edge thereof leading, a stop engaged by said closed folded edge when the product is fed thereto, a device along which the folded product is fed in said direction to said stop by the receiving and feeding means, said device being positioned to provide for delivery of the folded product therefrom in the opposite direction past said means and with an opposite open edge of the product leading, and mechanism for receiving the product from said device and producing a seal and applying it on said product over the leading open edge thereof.

12. In a machine of the character described, two rollers for receiving and feeding a folded product in one direction with a closed folded edge thereof leading, an inclined device spaced from the receiving and feeding rollers and along which the folded product is fed thereby in said direction and then delivered in the opposite direction with an opposite open edge of said product leading, mechanism for applying a seal on the product over the open leading edge thereof, and means including one of said two rollers and a third roller for feeding the product from said device to said mechanism with said open edge leading.

13. In a machine of the character described, two rollers for receiving and feeding a folded product in one direction with a closed folded edge thereof leading, a device spaced from the receiving and feeding rollers and along which the product is fed thereby in said direction, means including a third roller for feeding the product from the device in the opposite direction past one of said first named rollers and with an opposite open edge of the product leading, and means for applying a seal on said product over the open leading edge thereof.

14. In a machine of the character described, supporting and feeding means on which a folded product is delivered and fed with a closed folded edge thereof leading, an inclined panel or receiver spaced from the delivery end of the supporting and feeding means and along which the product is fed thereby with said edge leading, means for ejecting the product from the panel or receiver in the opposite direction clear of said first named means and with an opposite open edge of said product leading, and mechanism for applying a seal on said product over the leading open edge thereof.

15. In a machine of the character described, supporting and feeding means on which a folded product is delivered and fed with a closed folded edge thereof leading, an inclined panel or receiver spaced from the delivery end of the supporting and feeding means and along which the product is fed thereby with said edge leading, means for ejecting the product from the panel or receiver in the opposite direction clear of said first named means and with an opposite open edge of said product leading, means for feeding the product from the panel or receiver with said open edge leading, and mechanism for producing a seal and applying it on said product over the leading open edge thereof.

16. In a machine of the character described, means for supporting and feeding a folded product in one direction with a closed folded edge thereof leading, an inclined panel or receiver spaced from the supporting and feeding means and along which the product is fed thereby with said edge leading, reciprocating means for ejecting the product from the panel or receiver in the opposite direction clear of said supporting and feeding means and with an opposite open edge of said product leading, mechanism for producing a seal and applying it on the product over the leading open edge thereof, and means controlled through movement of said reciprocating means and controlling the operation of said mechanism.

17. In a machine of the character described, mechanism for producing a seal and applying it on a product, a source of power for operating the seal producing and applying mechanism, means for connecting said mechanism with and disconnecting the same from said source of power, an electrically operated device controlling the operation of said means, and means for controlling the operation of said electrically operated device through feeding of said product to the seal producing and applying mechanism.

18. In a machine of the character described, mechanism for producing a seal and applying it on a product, a source of power for operating the seal producing and applying mechanism, means for connecting said mechanism with and disconnecting the same from said source of power, an electrically operated device controlling the operation of said means, devices for moving the product in different directions during feeding thereof to the seal producing and applying mechanism, and means actuated by the product as it is moved in one of said directions, said last named means controlling the operation of said electrically operated device.

19. In a machine of the character described, mechanism for producing a seal and applying it on a product, a panel or receiver on which the product is moved in opposite directions during feeding of the same to the seal producing and applying mechanism, a source of power for operating the seal producing and applying mechanism, means for connecting said mechanism with and disconnecting the same from said source of power, an electrically operated device controlling the operation of said means, and means on said panel or receiver actuated by the product as it is moved thereon in one of said directions, said last named means controlling the operation of said electrically operated device.

20. In a machine of the character described, mechanism for producing a seal and applying it on a folded product, a panel or receiver on which the product is fed, means for feeding the product from the panel or receiver to said mechanism, an electrically operated device controlling the operation of the seal producing and applying mechanism, and means actuated by the product as it is fed on said panel or receiver, said last named means controlling the operation of said electrically operated device.

21. In combination, stationary and movable means arranged in spaced relation and formed to bend a seal, and means for feeding a product between said stationary and movable means to apply said seal on an edge portion of said product.

22. In combination, stationary and movable knives for cutting a seal from tape fed therebetween, a stop engaged by the leading edge of the tape when it is fed between the knives, and means for bending the seal in position for application thereof to an edge portion of a product fed between said knives and said stop.

23. In combination, stationary and movable knives, means for feeding tape therebetween, means for operating the movable knife whereby the tape may be fed as aforesaid and a seal cut therefrom by said knives, a stop device engaged by the leading end of the tape when it is fed between the knives, means for bending the seal rendered effective by engagement of said tape end with the stop and cutting of the tape by said knives, and means for feeding a product between said stop and the movable knife to apply said seal on an edge portion of said product.

24. In combination, a stationary knife, a reciprocating frame having a knife movable toward and away from the stationary knife, means for feeding tape between the knives whereby the latter may cut seals from the tape, a stop engaged by the leading end of the tape when it is fed between said knives, and seal bending means on said stop and said frame.

25. In combination, a stationary knife, a knife movable toward and away from the stationary knife, a driven shaft, connections between the driven shaft and the movable knife for reciprocating the latter, means for feeding tape between the knives whereby they may cut seals from said tape, means for moistening the tape, means for bending the seals, and connections between said shaft and said tape feeding means for intermittently operating the latter.

26. In a machine of the character described, means for receiving a folded product with a closed folded edge thereof leading, mechanism for applying a seal on the product over an opposite open edge thereof, and devices for delivering the product from the receiving means to the seal applying mechanism with the aforesaid open edge thereof leading and for continuously maintaining a side edge of the product parallel with the path of movement of said product from said receiving means to said mechanism.

27. In a machine of the character described, means for receiving a folded product with a closed folded edge thereof leading, mechanism for applying a seal on the product over an opposite open edge thereof, devices for delivering the product from the receiving means to the seal applying mechanism with said open edge leading and for continuously maintaining a side edge of the product parallel with the path of travel of said product from said receiving means to the seal applying mechanism, and means controlled by the product for operating said seal applying mechanism.

28. In a machine of the character described, mechanism for applying a seal on a product centrally over an open edge thereof, mechanism for receiving the product with an opposite closed folded edge thereof leading and including rotatable means, and devices including rotatable means parallel with said first named means for receiving the product from said last named mechanism with said closed folded edge leading and for delivering said product to the seal applying mechanism with said open edge leading.

29. In a machine of character described, mechanism for applying a seal on a product over an open edge thereof, mechanism for receiving the product with an opposite closed folded edge thereof leading and including a pair of driven parallel rollers, means including one of said rollers and a third driven roller parallel therewith for receiving the product from said last named mechanism with said closed folded edge leading and for delivering said product to the seal applying mechanism with said open edge leading, and means controlled by the product for operating said seal applying mechanism.

30. In a machine of the character described, mechanism for applying a seal on a folded product over an open edge thereof; means for receiving and feeding the folded product with an opposite closed folded edge thereof leading; inclined means along which the product is fed by said first named means with said closed edge leading, means for reversing the direction of movement of the product on the inclined means so that the product travels thereon with the opposite open edge thereof leading; and means, including rotatable elements, for delivering said product from said inclined means to said mechanism with said open edge leading.

31. In a machine of the character described, means for receiving a folded product with a closed folded edge thereof leading and comprising two rollers rotatable about parallel axes, a set of rollers parallel with the axes of rotation of said first named rollers and including one of the same, means for receiving the product from said first named means with said closed folded edge thereof leading and for delivering the product to said set of rollers with an opposite open edge leading, mechanism to which the product is delivered from the set of rollers with said open edge leading, and means forming part of said mechanism for applying a seal on the product over the open leading edge thereof.

32. In a machine of the character described, a set of two driven rollers for receiving a folded product with a closed folded edge thereof leading, a set of two driven rollers parallel with said first named rollers and including one of the same, means for receiving the folded product from the first set of rollers with said folded edge leading and for delivering said product to the second set of rollers with an opposite open edge leading, and mechanism for applying a seal on said product over the open leading edge thereof.

33. In sealing apparatus for use with a sheet folding machine having mechanism from which a folded product is delivered with a closed edge thereof leading, means adapted to be mounted on the folding machine for receiving the product from said mechanism with said closed edge leading and for delivering the product with an opposite open edge thereof leading, and mechanism adapted to be mounted on said folding machine for receiving the product from said receiving and delivering means with the open edge aforesaid of the product leading and for applying a seal on said product over said open edge thereof.

34. In sealing apparatus for use with a sheet folding machine having mechanism from which a folded product is delivered with a closed edge thereof leading, mechanism for applying a seal on an opposite open edge of the product and adapted to be mounted on the folding machine in spaced relation with the first named mechanism, and means adapted to be mounted on said machine between said mechanisms for receiving the product from the first named mechanism with said closed edge of the product leading and for delivering said product to said seal applying mechanism with said open edge of the product leading.

35. In sealing apparatus for use with a sheet folding machine having mechanism from which a folded product is delivered with a closed edge thereof leading, mechanism adapted to be mounted on the folding machine and comprising means for feeding a gummed strip from a roll, means for moistening said strip, means for separating a seal from the moistened strip, and means for applying said seal on the product over an opposite open edge thereof, and means adapted to be mounted on said folding machine for receiving the product from said first named mechanism with said closed edge of the product leading and for delivering said product to said seal applying means with said open edge of the product leading.

36. In sealing apparatus for use with a sheet fold machine having mechanism from which a folded product is delivered with a closed edge thereof leading, a panel or receiver adapted to be mounted on the folding machine, means adapted to be mounted on said machine for receiving the folded product from said mechanism and delivering the product along the panel or receiver with said closed edge of the product leading, mechanism adapted to be mounted on the folding machine for applying a seal on the product over an opposite open edge thereof, and means adapted to be mounted on the folding machine for delivering the product from said panel or receiver to said seal applying mechanism with said open edge of the product leading.

37. In sealing apparatus for use with a sheet folding machine having mechanism from which a folded product is delivered with a closed edge thereof leading, means adapted to be mounted on the folding machine for receiving the product from said mechanism with said closed edge of the product leading and for delivering the product with an opposite open edge thereof leading, mechanism adapted to be mounted on the folding machine for receiving the product from said receiving and delivering means with the open edge aforesaid of the product leading and for applying a seal on said product over said open edge thereof, and means controlled by the product through movement thereof and controlling the operation of said last named mechanism.

38. In sealing apparatus for use with a sheet folding machine having mechanism from which a folded product is delivered with a closed edge thereof leading, means adapted to be mounted on the folding machine for receiving the product from said mechanism with said closed edge of the product leading and for delivering the product with an opposite open edge thereof leading, and mechanism adapted to be mounted on said folding machine for receiving the product from said receiving and delivering means with the open edge aforesaid of the product leading and for applying a seal on said product over said open edge thereof, said last named mechanism being adapted for adjustment laterally of the folding machine to accommodate products of various widths and insure application of seals to the open edges thereof at any desired position therealong.

39. In apparatus of the character described, means for feeding a strip gummed on one side thereof, means served thereby for bending a gummed seal so that gummed portions thereof are faced toward each other in angular relation, means for cutting the seal off the leading end of said strip when the seal is about to be bent as aforesaid, means for applying the seal on a folded product over an edge thereof and affixing the opposed gummed portions of the seal on opposite sides of said product, and means for feeding the product to the bending and supporting means, between said opposed gummed portions of the seal, and through said applying and affixing means, with said edge of the product leading.

40. In apparatus of the character described, driven rollers for feeding a strip and moistening a gummed side thereof, means served by said rollers for bending a gummed seal so that gummed portions thereof are faced toward each other in angular relation, a reciprocating knife for cutting the seal off the leading end of said strip when the seal is about to be bent as aforesaid, means for applying the seal on a folded product over an edge thereof and affixing the opposed gummed portions of the seal on opposite sides of said product, and means for feeding the product through the bending and supporting means, between said opposed gummed portions of the seal, and through said applying and affixing means, with said edge of the product leading.

41. In feeding and sealing apparatus for use in folding machines, a frame adapted to be mounted on the folding machine opposite mechanism thereof from which a folded product is delivered, means on the frame for bending a seal and applying it on the product over an edge thereof, means on the frame for supplying the seal to the bending and applying means, and means on said frame for receiving the folded product and feeding said product into the bent seal and through said bending and applying means with said edge of the product leading.

42. In feeding and sealing apparatus for use in folding machines, a frame adapted to be mounted on the folding machine opposite mechanism thereof from which a folded product is delivered, devices on the frame for supporting a gummed seal and bending it so that gummed portions thereof are faced toward each other in angular relation, means on the frame for supplying the seal to the seal supporting and bending devices, means on the frame for applying the seal on the product over an edge thereof and affixing the opposed gummed portions of the seal on opposite sides of the product, and means on said frame for feeding the product through the seal supporting and bending means, into the bent seal, and through said applying and affixing means, with said edge of the product leading.

43. In feeding and sealing apparatus for use on folding machines, a frame adapted to be mounted in the folding machine opposite mechanism thereof from which folded products are delivered, means on the frame for bending seals successively and applying them in like manner on the folded products over corresponding edges thereof, means on the frame for supplying the seals one after another to the bending and applying means, and means on said frame for receiving the products successively and feeding them in like manner into successive bent seals and through said bending and applying means with said edges leading.

44. In feeding and sealing apparatus for use on folding machines, a frame adapted to be mounted on the folding machine opposite mechanism thereof from which a folder is delivered, means on the frame for bending a seal and applying it on the folder over an edge thereof, driven means on the frame for supplying the seal to the bending and applying means, means on the frame for receiving the folder and feeding said folder into the gummed seal and through said bending and applying means with said edge of the folder leading, means for driving the folder feeding means, and means on said frame for driving said seal supplying means from said folder feeding means.

RAY OHLSEN.
ANTON J. KNUTKOWSKI.